United States Patent
Insixiengmai et al.

(10) Patent No.: US 10,690,039 B2
(45) Date of Patent: Jun. 23, 2020

(54) COOLING DEVICE ANOMALY DIAGNOSING APPARATUS

(71) Applicant: TOYOTA JIDOSHA KABUSHIKI KAISHA, Toyota-shi (JP)

(72) Inventors: Leuth Insixiengmai, Nagoya (JP); Sei Maruta, Toyota (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 35 days.

(21) Appl. No.: 16/207,244

(22) Filed: Dec. 3, 2018

(65) Prior Publication Data

US 2019/0186337 A1 Jun. 20, 2019

(30) Foreign Application Priority Data

Dec. 15, 2017 (JP) .................................. 2017-240961

(51) Int. Cl.
*F01P 7/14* (2006.01)
*G01M 15/05* (2006.01)
(Continued)

(52) U.S. Cl.
CPC .................. *F01P 7/14* (2013.01); *F01P 3/20* (2013.01); *F01P 11/16* (2013.01); *G01M 15/046* (2013.01); *G01M 15/048* (2013.01); *G01M 15/05* (2013.01); *F01P 2007/146* (2013.01); *F01P 2025/08* (2013.01); *F01P 2031/36* (2013.01); *F01P 2070/10* (2013.01)

(58) Field of Classification Search
CPC ...... F01P 7/14; F01P 3/20; F01P 11/16; F01P 2007/146; F01P 2025/08; F01P 2031/18; F01P 2031/36; F01P 2031/32; F01P 2031/20; G01M 15/046; G01M 15/048; G01M 15/05

See application file for complete search history.

(56) References Cited

U.S. PATENT DOCUMENTS

| 4,669,426 A * | 6/1987 | Hirano ..................... F01P 11/14 123/198 DB |
| 2013/0327133 A1* | 12/2013 | Yamashita ............ F01K 23/065 73/114.68 |
| 2017/0096929 A1* | 4/2017 | Kaneko ..................... F01P 3/20 |

FOREIGN PATENT DOCUMENTS

| JP | 2000-220456 | 8/2000 |
| JP | 2017-067045 | 4/2017 |

* cited by examiner

*Primary Examiner* — Syed O Hasan
(74) *Attorney, Agent, or Firm* — Oblon, McClelland, Maier & Neustadt, L.L.P.

(57) ABSTRACT

An anomaly diagnosing apparatus is adapted for a cooling device in an internal combustion engine. The apparatus is configured to execute an enlarging process, a rate calculating process, and an anomaly determining process. The enlarging process includes enlarging the cross-sectional area of the flow passage between an inner channel and an outer channel in the cooling device. The rate calculating process includes calculating a reference rate for a rate of rise of temperature of cooling water. The anomaly determining process includes determining that an anomaly is present in the check valve if a rate of rise of a detection value of cooling water temperature is smaller than the reference rate. The rate calculating process includes calculating the reference rate such that the reference rate has a smaller value in a case where the enlarging process is executed than in a case where the enlarging process is not executed.

5 Claims, 6 Drawing Sheets

(51) Int. Cl.
*F01P 11/16* (2006.01)
*F01P 3/20* (2006.01)
*G01M 15/04* (2006.01)

COOLING DEVICE ANOMALY DIAGNOSING APPARATUS

BACKGROUND

The present disclosure relates to a cooling device anomaly diagnosing apparatus that is adapted for a cooling device in an internal combustion engine. In particular, the cooling device includes: an inner channel serving as a cooling channel located inside the internal combustion engine; an outer channel serving as a cooling channel located outside the internal combustion engine, the outer channel constituting, together with the inner channel, a loop path in which cooling water is circulated; and a regulating device capable of adjusting the cross-sectional area of the flow passage between the inner channel and the outer channel by an electronic control. The regulating device includes a check valve configured to open when a pressure inside is higher than a pressure in the outer channel by an amount greater than or equal to a predetermined amount.

For example, Japanese Patent Laid-Open No. 2017-67045 discloses a multi-way valve (regulating device) with a check valve. The check valve is capable of adjusting the cross-sectional area of a flow passage between a cooling channel located inside the internal combustion engine and a cooling channel located outside the engine by an electronic control and is configured to open when the pressure inside is higher than the pressure in the outside cooling channel by an amount greater than or equal to a predetermined amount.

SUMMARY

The present inventors reviewed a process of diagnosing a stuck-open anomaly, during which the check valve is kept open constantly, as part of an anomaly diagnosing process for the regulating device. Specifically, the regulating device is in general kept substantially in a valve-closed state when the temperature in the internal combustion engine is low in order to prevent cooling water in the inside cooling channel from flowing out to the outside cooling channel. From this point of view, the present inventors considered to diagnose whether a stuck-open anomaly is present or not based on the rate of rise of the temperature of cooling water while the regulating device is controlled to close the valve. In a conventional device, as the rotational speed of the internal combustion engine increase, the device is controlled to cause the cooling water to flow out from the inside cooling channel to the outside cooling channel in order to avoid an excessively high pressure of the cooling water in the inside cooling channel. In such a device, execution of the control to cause the cooling water to flow out causes a decrease in the rate of rise of the cooling water temperature. Therefore, the present inventors found out that there may be a risk of a decrease in the accuracy of anomaly diagnosis.

Example 1

A cooling device anomaly diagnosing apparatus adapted for a cooling device in an internal combustion engine is provided. The cooling device includes an inner channel serving as a cooling channel located inside the internal combustion engine, an outer channel serving as a cooling channel located outside the internal combustion engine, and a regulating device. The outer channel constitutes, together with the inner channel, a loop path in which cooling water is circulated. The regulating device is capable of adjusting a cross-sectional area of a flow passage between the inner channel and the outer channel by an electronic control. The regulating device includes a check valve configured to open when a pressure inside is higher than a pressure in the outer channel by an amount greater than or equal to a predetermined amount. The anomaly diagnosing apparatus is configured to execute: an enlarging process of enlarging the cross-sectional area of the flow passage by operating the regulating device such that the cross-sectional area is larger in a case where a rotational speed of a crankshaft of the internal combustion engine is at a predetermined speed or higher than in a case where the rotational speed is lower than the predetermined speed; a rate calculating process of calculating, within a predetermined time period after startup of the internal combustion engine, a reference rate such that the reference rate has a larger value in a case where a fuel injection amount of the internal combustion engine is large than in a case where the fuel injection amount is small, the reference rate being a reference value for a rate of rise of a cooling water temperature in sections of the loop path other than the outer channel; and an anomaly determining process of determining, within the predetermined time period, that an anomaly is present in the check valve if a rate of rise of a detection value of a cooling water temperature in paths other than the outer channel is smaller than the reference rate. The rate calculating process includes calculating the reference rate such that the reference value has a smaller value in a case where the enlarging process is executed than in a case where the enlarging process is not executed.

With the above configuration, it is possible to prevent the pressure of the cooling water in the inner channel from excessively increasing by executing the enlarging process. In addition, the anomaly diagnosis can be performed by calculating the reference rate such that the reference rate has a smaller value in the case where the enlarging process is executed than in the case where the enlarging process is not executed since the rate of rise of the cooling water temperature in the inner channel decreases due to the cooling water in the outer channel flowing into the inner channel. In this way, a decrease in the accuracy of anomaly diagnosis is avoided.

Example 2

The cooling device anomaly diagnosing apparatus of Example 1 is further configured to execute an integrating process of calculating a flow rate integrated value, which is an integrated value of an amount of cooling water circulating in the loop path through the regulating device within a period in which the cross-sectional area of the flow passage is enlarged by the enlarging process. The rate calculating process includes calculating the reference rate such that the reference rate has a smaller value in a case where the flow rate integrated value is small than in a case where the flow rate integrated value is large.

Once the cooling water in the outer channel flows into the inner channel, the cooling water temperature in the inner channel decreases. However, as the integrated value of the amount of cooling water flowing into the inner channel increases, the cooling water temperature in the outer channel rises. Consequently, a decrease in the rate of rise of the cooling water temperature in the inner channel is slowed. In view of this nature, in the above configuration, the process of setting the reference rate based on the flow rate integrated value is implemented.

Example 3

The cooling device anomaly diagnosing apparatus of Example 1 or 2 is further configured to execute a temperature calculating process of calculating a reference temperature based on the integrating process of the reference rate. The reference temperature is a reference value for a cooling water temperature. The rate calculating process includes calculating, within a period in which the cross-sectional area of the flow passage is enlarged by the enlarging process, the reference rate such that the reference rate has a smaller value in a case where an amount by which the reference temperature is higher than an outside air temperature is great than in a case where the amount is small, and a reference rate calculated by the process may be a negative value.

The outside air temperature tends to have a positive correlation with the cooling water temperature in the outer channel. Thus, the cooling water temperature in the outer channel is considered to be lower than the cooling water temperature in the inner channel in the case where the amount by which the reference temperature is higher than the outside air temperature is great than in the case where the amount is small. Accordingly, it is considered that the amount of decrease in the rate of rise of the cooling water temperature by the enlarging process is large. In the above configuration, therefore, the reference rate is calculated to have a smaller value in the case where the amount by which the reference temperature is higher than the outside air temperature than in the case where the amount is small.

Example 4

The cooling device anomaly diagnosing apparatus of any one of Examples 1 to 3 is further configured to execute a temperature calculating process of calculating a reference temperature based on the integrating process of the reference rate. The reference temperature is a reference value for cooling water temperature. The anomaly determining process is a process of, when the reference temperature reaches or exceeds a threshold earlier than the detection value of the cooling water temperature reaching or exceeding the threshold, determining that the rate of rise of the detection value of the cooling water temperature is smaller than the reference rate and an anomaly is present in the check valve.

After cold start of the internal combustion engine, the cross-sectional area of the flow passage between the inner channel and the outer channel tends to be limited to a small value until the cooling water temperature reaches a predetermined temperature. Accordingly, in the above configuration, the threshold is set at a predetermined temperature or lower, so that it is possible to diagnose whether an anomaly is present or not while the cross-sectional area of the flow passage is limited to a small value. In this way, the number of factors that should be taken into consideration is reduced when diagnosing whether an anomaly is present or not.

Example 5

The cooling device anomaly diagnosing apparatus of Example 4 includes a detection-value counter and a reference counter. The anomaly determining process includes: a detection value increment process of incrementing the detection-value counter each time the detection value of cooling water temperature reaches or exceeds the threshold; a reference increment process of incrementing the reference counter each time the reference temperature reaches or exceeds the threshold; and a process of determining that an anomaly is present in the check valve when the reference counter reaches the predetermined value before the detection-value counter reaches the predetermined value.

In the above configuration, the time at which the reference counter reaches the predetermined value and the time at which the detection-value counter reaches the predetermined value are compared to each other, so that it is possible to enhance immunity to noises in the process of determining which one of the rate of rise of the reference temperature or the rate of rise of the detection value is larger.

Other aspects and advantages of the present disclosure will become apparent from the following description, taken in conjunction with the accompanying drawings, illustrating exemplary embodiments.

BRIEF DESCRIPTION OF THE DRAWINGS

The disclosure may be understood by reference to the following description together with the accompanying drawings.

DETAILED DESCRIPTION

A cooling device anomaly diagnosing apparatus according to an embodiment will now be described with reference to the drawings.

Figure 1:
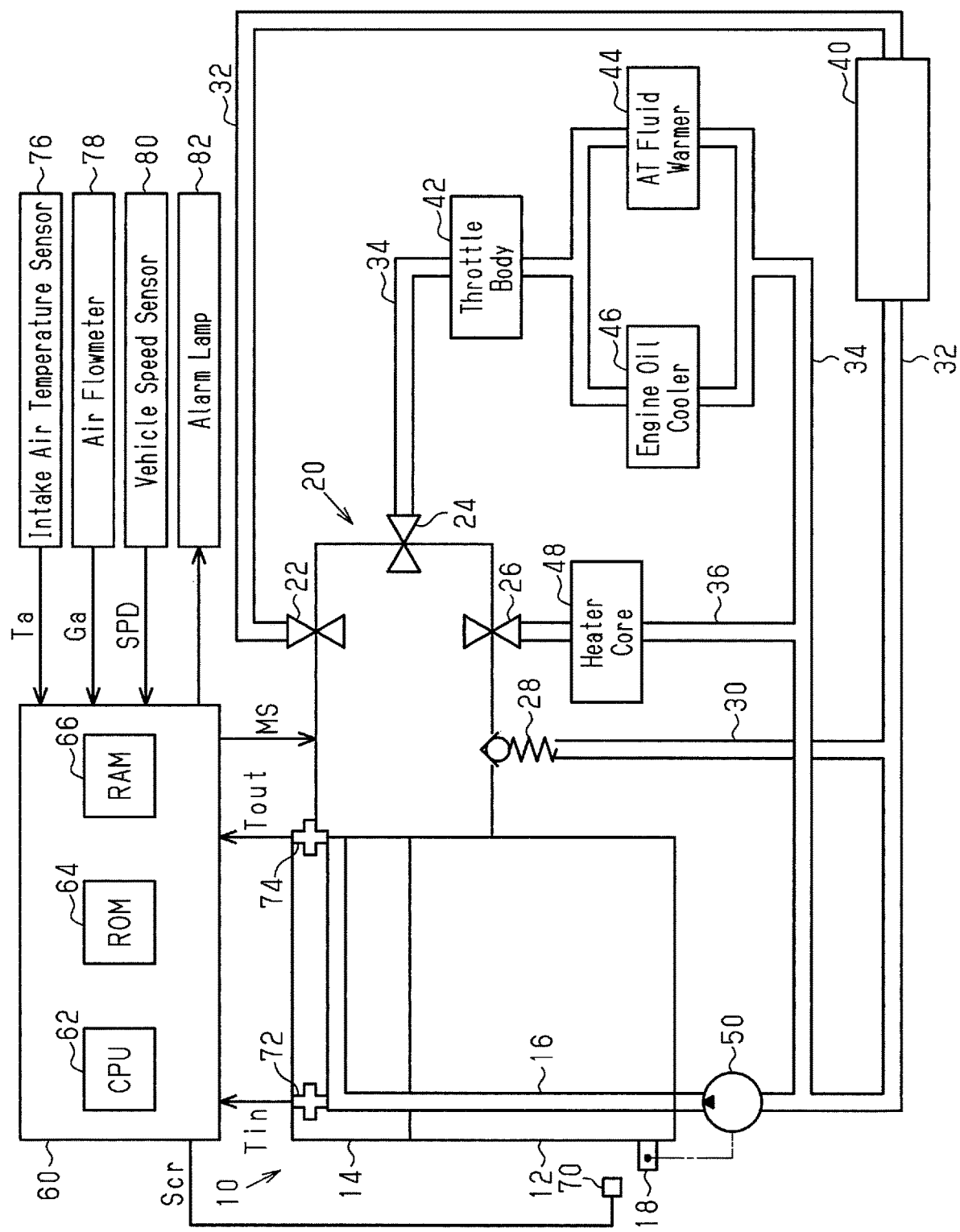
FIG. 1 illustrates an anomaly diagnosing apparatus and a cooling device according to an embodiment.

An internal combustion engine 10 illustrated in FIG. 1 is of a spark-ignition type and mounted on a vehicle. The internal combustion engine 10 includes a cylinder block 12 and a cylinder head 14. The cylinder block 12 and the cylinder head 14 are provided therein with an inner channel 16 serving as a channel for cooling water. The inner channel 16 is provided with a multi-port valve 20 at the exit of the channel. The multi-port valve 20 is an electronic-controlled regulating device for adjusting the cross-sectional area of the flow passage between each of a plurality of channels connected to the inner channel 16 through the multi-port valve 20 and the inner channel 16. The multi-port valve 20 includes three ports: a radiator port 22, a device port 24, and a heater core port 26. Opening ratios of the ports 22, 24 and 26 are each adjustable by an electronic control. The radiator port 22 is connected to a radiator channel 32 that forms a loop path extending via the radiator 40 together with the inner channel 16. The device port 24 is connected to a device channel 34 that forms a loop path extending via a throttle body 42, an AT fluid warmer 44 for increasing the fluid temperature of the transmission, and an engine oil cooler 46 together with the inner channel 16. The heater core port 26 is connected to a heater core channel 36 that forms a loop path extending via a heater core 48 together with the inner channel 16. The opening ratio is the ratio of the opening area when the valve is fully opened to the actual opening area, and is exemplarily represented in percentage herein. The multi-port valve 20 includes a mechanical check valve 28. The check valve 28 opens when the pressure in the multi-port valve 20 is higher than the pressure in the pressure relief channel 30 by an amount greater than or equal to a predetermined amount. The pressure relief channel 30 is connected to the radiator channel 32.

The cross-sectional area of the flow passage of the radiator channel 32 is larger than the cross-sectional area of the flow passage of the device channel 34 and the heater core channel 36. In particular, when all the opening ratios of the radiator port 22, the device port 24, and the heater core port 26 are at maximum values, the flow rate of the cooling water flowing through the radiator channel 32 is larger than the sum of the flow rate of the cooling water flowing through the device channel 34 and the flow rate of the cooling water flowing through the heater core channel 36. The radiator channel 32, the device channel 34, and the heater core channel 36 merge together downstream, and are connected to a suction port of a water pump 50. The water pump 50 is an engine-driven type that is driven by a turning force of a crankshaft 18 of the internal combustion engine 10.

A control device 60 is configured to control the internal combustion engine 10. The control device 60 is configured to operate operated portions of the internal combustion engine 10 such as an ignition device and a fuel injection valve in order to control controlled variables such as torque and exhaust components for the internal combustion engine 10. For example, the control device 60 operates an injection amount of the fuel injection valve in order to control the air-fuel ratio into a desired air-fuel ratio based on an air amount loaded into a combustion chamber in the internal combustion engine 10. When controlling the controlled variables, the control device 60 refers to an output signal Scr from a crank angle sensor 70, the cooling water temperature upstream of the exit of the inner channel 16 as detected by a first water temperature sensor 72 (internal temperature Tin), and the cooling water temperature at the exit of the inner channel 16 as detected by the second water temperature sensor 74 (exit temperature Tout). In addition, the control device 60 refers to an intake air temperature Ta detected by an intake air temperature sensor 76, an intake air amount Ga detected by an air flowmeter 78, and a vehicle speed SPD detected by a vehicle speed sensor 80. The intake air temperature Ta herein corresponds to temperature that can be considered as outside air temperature. The control device 60 includes a CPU 62, a ROM 64, and a RAM 66. The control device 60 is configured to control the controlled variables by causing the CPU 62 to execute a program stored in the ROM 64.

The control device 60 is configured to operate the multi-port valve 20 in order to control temperature of the internal combustion engine 10. The multi-port valve 20 is configured to be capable of adjusting the opening ratio of each of the radiator port 22, the device port 24 and the heater core port 26 by means of a single manipulated variable, a valve phase θ.

Figure 2:
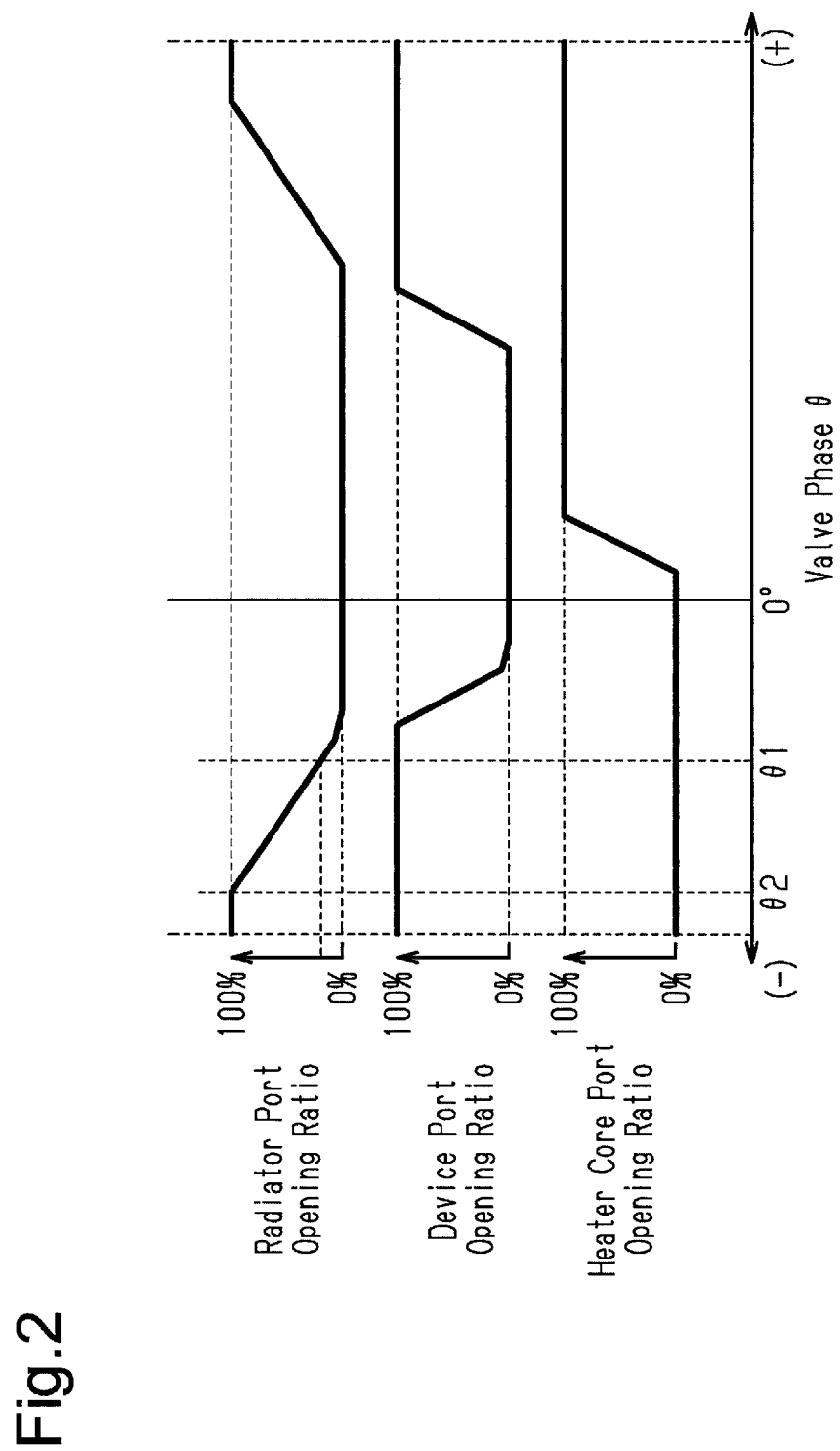
FIG. 2 illustrates an example control on a multi-port valve according to the embodiment.

FIG. 2 illustrates a relation between the opening ratio of each of the radiator port 22, the device port 24 and the heater core port 26 by means of the multi-port valve 20 and the valve phase θ. As illustrated in FIG. 2, when the valve phase θ is zero, the opening ratio of each of the radiator port 22, the device port 24 and the heater core port 26 is zero. As the valve phase θ increases while the value of the valve phase θ is positive, the opening ratio of the heater core port 26 first increases from zero, then the opening ratio of the device port 24 increases from zero, and lastly, the opening ratio of the radiator port 22 increases from zero. Further, as the absolute value of the valve phase θ increases while the value of the valve phase θ is negative, the opening ratio of the device port 24 first increases from zero, and then the opening ratio of the radiator port 22 increases from zero.

During cold start of the internal combustion engine 10, the control device 60 basically brings all the opening ratios of the radiator port 22, the device port 24, and the heater core port 26 to zero for accelerating warming-up of the internal combustion engine 10.

Figure 3:
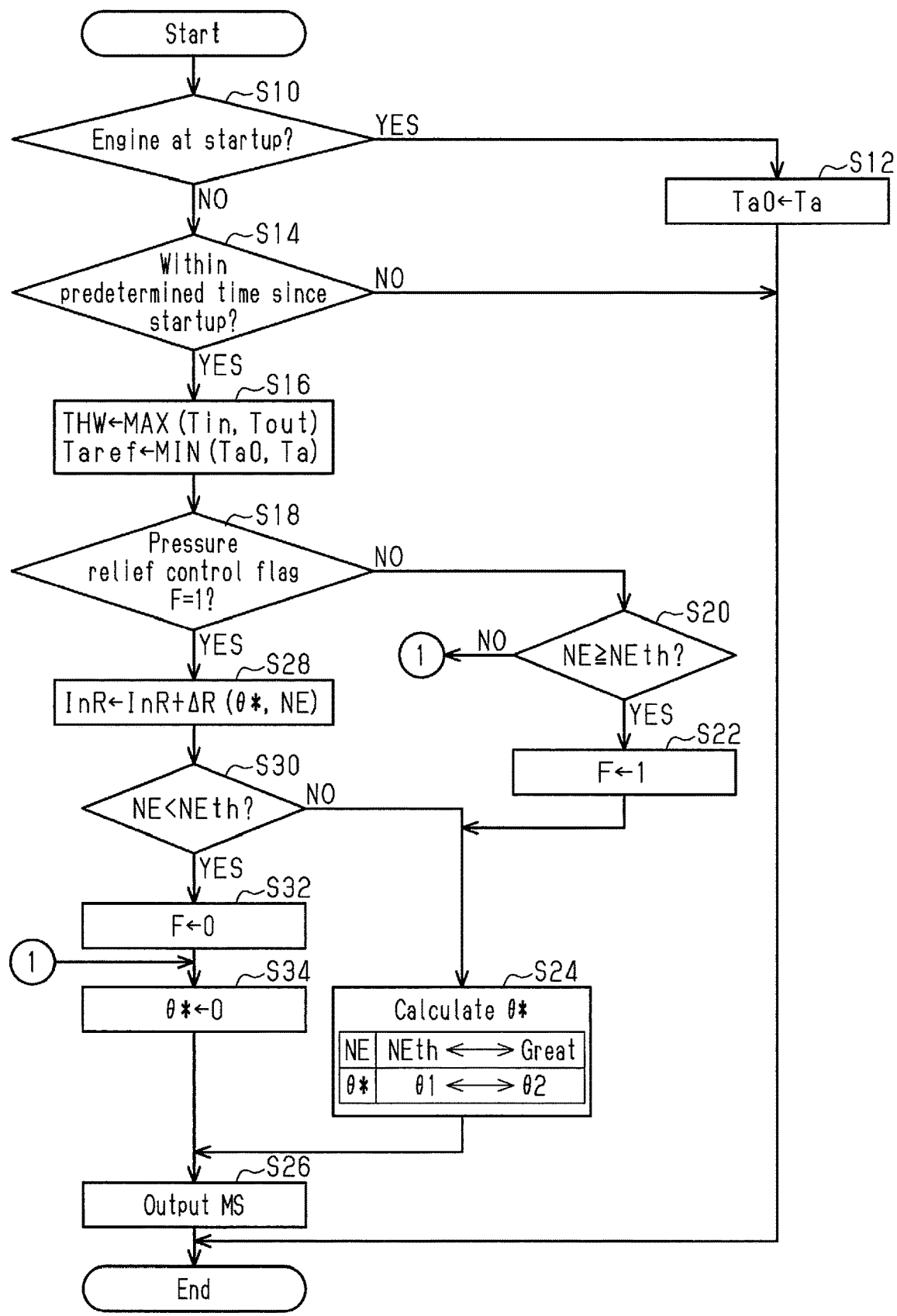
FIG. 3 is a flowchart illustrating a procedure for processes executed by a control device according to the embodiment.

FIG. 3 illustrates a procedure for processes related to control performed until completion of the warming-up of the internal combustion engine 10. The processes illustrated in FIG. 3 are implemented by the CPU 62 repeating a program stored in the ROM 64 in a predetermined cycle, for example. In the following, numerals with a prefix S are used to represent step numbers.

In a series of processes illustrated in FIG. 3, the CPU 62 first determines whether or not the internal combustion engine 10 is at a startup (S10). If the CPU 62 determines that the internal combustion engine 10 is at a startup (S10: YES), the CPU 62 assigns the current intake air temperature Ta to an initial intake air temperature Ta0 (S12).

If the CPU 62 determines that the internal combustion engine 10 is not at a startup (S10: NO), the CPU 62 determines whether or not a predetermined time period has passed since the startup of the internal combustion engine 10 (S14). The predetermined time period herein may be duration within which a water temperature THW described later, for example, reaches a predetermined temperature TT (for example, 75° C.). Then, the CPU 62 assigns an internal temperature Tin or an exit temperature Tout, whichever larger, to the water temperature THW, and the initial intake air temperature Ta0 or the intake air temperature Ta, whichever smaller, to a reference intake air temperature Taref (S16).

Next, the CPU 62 determines whether or not a pressure relief control flag F is 1 (S18). The pressure relief control flag F is a flag for preventing the pressure of the cooling water in the inner channel 16 or the multi-port valve 20 from excessively rising. The pressure relief control flag F is 1 while a pressure relief control, which is a process to open the multi-port valve 20, is being performed and 0 otherwise, even when the water temperature THW is less than the predetermined temperature TT. If the CPU 62 determines that the pressure relief control flag F is 0 (S18: NO), the CPU 62 determines whether or not a rotational speed NE is at a predetermined speed NEth or higher (S20). This process is executed for determining whether or not the pressure of the cooling water in the inner channel 16 and the multi-port valve 20 may excessively increase and the radiator channel 32, the device channel 34, or the heater core channel 36 may be detached from the multi-port valve 20. At this point, the pressure of the cooling water may excessively increase if the rotational speed NE is high because the water pump 50 is mechanically driven. In other words, the flow rate of the cooling water that can be caused to flow per unit time by the water pump 50 is higher in the case where the rotational speed NE is large than in the case where the rotational speed NE is small, if the multi-port valve 20 is open. Consequently, the pressure of the cooling water in the inner channel 16 is higher in the case where the rotational speed NE is large than in the case where the rotation speed NE is smaller.

If the CPU 62 determines that the rotational speed NE is at a predetermined speed NEth or higher (S20: YES), the CPU 62 sets the pressure relief control flag F to 1 (S22). Then, the CPU 62 changeably sets a command value θ* for the valve phase θ in the range from θ1 to θ2 as illustrated in FIG. 2 (S24). The process S24 is a process of increasing the opening ratios of both the device port 24 and the radiator port 22 from zero. Further, the CPU 62 sets the opening ratio of the radiator port 22 to a larger value by the process S24 in the case where the rotational speed NE is large than in the case where the rotational speed NE it is small.

Specifically, a map data is stored in the ROM 64, the map data taking the rotational speed NE as an input variable and the valve phase θ as an output variable. The CPU 62 performs a map calculation to find a command value θ* for the valve phase θ. The map data is a combination data of a discrete value of an input variable and a value of an output variable corresponding to each input variable. For example, the map calculation includes a process in which if a value of an input variable matches any value of an input variable of the map data, the value of the output variable of the corresponding map data is taken as an operation result. The map calculation includes a process in which if a value of an input variable does not match any value of an input variable of the map data, a value obtained from interpolation of a plurality of output variables contained in the map data is taken as an operation result.

Upon setting the command value θ*, the CPU 62 outputs a manipulating signal MS to the multi-port valve 20 to manipulate the valve phase θ such that the valve phase θ becomes the command value θ* (S26).

If the CPU 62 determines that the pressure relief control flag F is 1 (S18: YES), the CPU 62 updates a flow rate integrated value InR, the flow rate integrated value InR being an integrated value of flow rates of the cooling water flowing out from the inner channel 16 to the outside through the multi-port valve 20 after the pressure relief control is executed (S28). At this point, the CPU 62 changeably sets a flow rate ΔR in a control cycle of the series of processes illustrated in FIG. 3 depending on the command value θ* and the rotational speed NE. The CPU 62 assigns, to the flow rate integrated value InR, a value obtained by adding the flow rate ΔR to the flow rate integrated value InR. Specifically, the CPU 62 sets the flow rate ΔR to a larger value in the case where the absolute value of the command value θ* is large than in the case where the absolute value is small. Further, the CPU 62 sets the flow rate OR to a larger value in the case where the rotational speed NE is large than in the case where the rotational speed NE is small. For example, a map data is stored in the ROM 64, the map data taking the valve phase θ and the rotational speed NE as input variables and the flow rate ΔR as an output variable. The CPU 62 performs a map calculation to find a flow rate ΔR.

Next, the CPU 62 determines whether or not the rotational speed NE is less than the predetermined speed NEth (S30). This process is executed for determining whether or not the pressure relief control should be stopped. If the CPU 62 determines that the rotational speed NE is equal to or higher than the predetermined speed NEth (S30: NO), then, the CPU 62 proceeds to the process S24. In contrast, if the CPU 62 determines that the rotational speed NE is less than the predetermined speed NEth (S30: YES), the CPU 62 sets the pressure relief control flag F to 0 (S32). When the process S32 is completed, and if the CPU 62 makes a negative determination at the process S20, the CPU 62 assigns zero to the command value θ* (S34) and proceeds to the process S26.

When the processes S12 and S26 are completed, and if the CPU 62 makes a negative determination at the process S14, the CPU 62 ends the series of processes illustrated in FIG. 3.

The control device 60 executes a diagnosing process for the check valve 28 in the predetermined time period, as a diagnosing process for the multi-port valve 20. The reason is as follows. The multi-port valve 20 is in a valve-closed state within the predetermined time period except during the pressure relief control. Accordingly, it is easy to diagnose whether a stuck-open anomaly is present or not based on the fact that the actual rate of rise of the temperature is lower than the rate of rise of the cooling water temperature on the premise that the cooling water does not flow out from the inner channel 16 to the outside through the multi-port valve 20.

Figure 4:
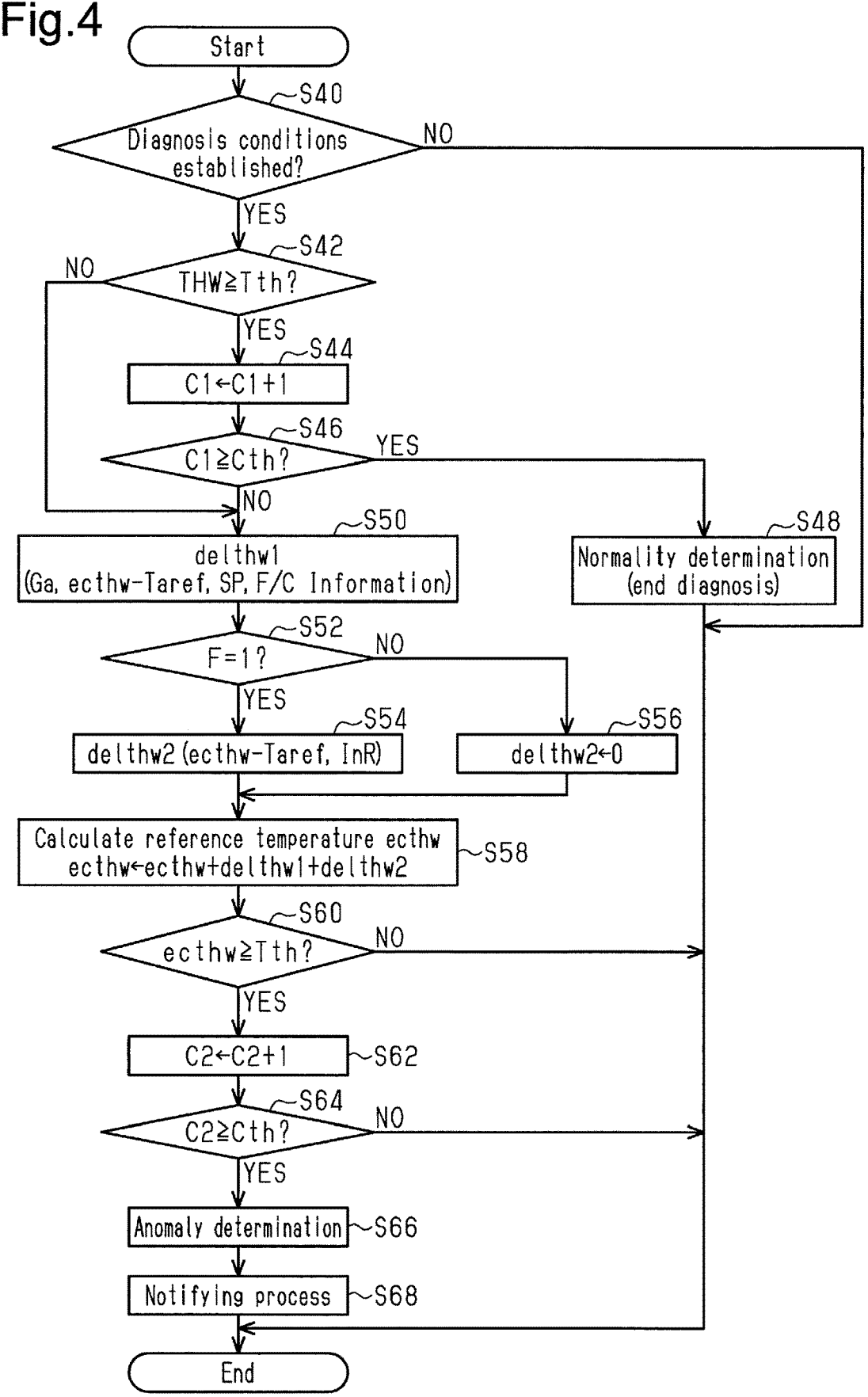
FIG. 4 is a flowchart illustrating a procedure for processes executed by the control device according to the embodiment.

FIG. 4 illustrates a procedure for processes related to the diagnosis of whether an anomaly is present or not in the check valve 28. The processes illustrated in FIG. 4 are implemented by the CPU 62 repeating a program stored in the ROM 64 in a predetermined cycle, for example.

In a series of processes illustrated in FIG. 4, the CPU 62 first determines whether or not conditions are established for executing the diagnosis of whether a stuck-open anomaly is present or not in the check valve 28 (S40). The conditions for executing the diagnosis herein are that the following three conditions are all satisfied: (A) a water temperature THW during engine start is equal to or lower than a predetermined temperature (for example, 35° C.); (B) the absolute value of a difference between the water temperature THW during engine start and an initial intake air temperature Ta0 is equal to or lower than a predetermined value; and (C) diagnosis is still incomplete in the current trip.

The condition (A) herein indicates that the water temperature THW is sufficiently lower than a threshold Tth described later. The condition (B) is for determining whether or not the internal combustion engine 10 is placed in a thermal equilibrium state with ambient gas at a sufficient level.

The trip herein is duration within which the drive permission switch of the vehicle is turned on from off and again turned off.

For example, the drive permission switch herein corresponds to an ignition switch in the case of a vehicle provided with the internal combustion engine 10 as its only drive source. If the CPU 62 determines that the conditions for executing the diagnosis are established (S40: YES), the CPU 62 determines whether or not the water temperature THW is equal to or higher than the threshold Tth (S42).

The threshold Tth herein is set at a predetermined temperature TT or lower. If the CPU 62 determines that the water temperature THW is equal to or higher than the threshold Tth (S42: YES), the CPU 62 increments a detection-value counter C1 (S44). Then, the CPU 62 determines whether or not the detection-value counter C1 is equal to or higher than a predetermined value Cth (S46). If the CPU 62 determines that the detection-value counter C1 is equal to or higher than the predetermined value Cth (S46: YES), the CPU 62 determines that the check valve 28 is normal (S48). When the normal determination is made, the diagnosis ends.

In contrast, if the CPU 62 determines that the detection-value counter C1 is lower than the predetermined value Cth (S46: NO), the CPU 62 calculates a first update amount delthw1 that defines the rate of rise of a reference temperature ecthw based on an intake air amount Ga, a value obtained by subtracting a reference intake air temperature Taref from a reference temperature ecthw, the vehicle speed SPD, and information indicative of whether or not a fuel-cutoff process is executed (S50). The reference temperature ecthw herein is set to have a value slightly smaller than a lower limit value that the water temperature THW can take when the check valve 28 is normal. The first update amount delthw1 is set to have a lower limit value that the rate of rise of the water temperature THW can take when the check valve 28 is normal and the pressure relief control is not performed.

Specifically, when the fuel-cutoff process is not executed, the CPU 62 calculates the first update amount delthw1 having a larger value in the case where the intake air amount Ga is large than in the case where the intake air amount Ga is small. This is in view of the fact that a larger amount of air is loaded into a combustion chamber in the case where the intake air amount Ga is large than in the case where the intake air amount Ga is small and the injection amount also increases, so that the combustion energy increases. In addition, the CPU 62 sets the first update amount delthw1 at a smaller value in the case where the value obtained by subtracting the reference intake air temperature Taref from the reference temperature ecthw is large than in the case where the obtained value is small. This is in view of the fact that the amount of heat dissipation of the internal combustion engine 10 is greater in the case where the amount by which the reference temperature ecthw is higher than the reference intake air temperature Taref than in the case where the amount is small. In addition, the CPU 62 sets the first update amount delthw1 at a smaller value in the case where the vehicle speed SPD is large than in the case where the vehicle speed SPD is small. This is in view of the fact that a larger amount of air is blown per unit time to the internal combustion engine 10 in the case where the vehicle speed SPD is large than in the case where the vehicle speed SPD is small.

Figure 5:
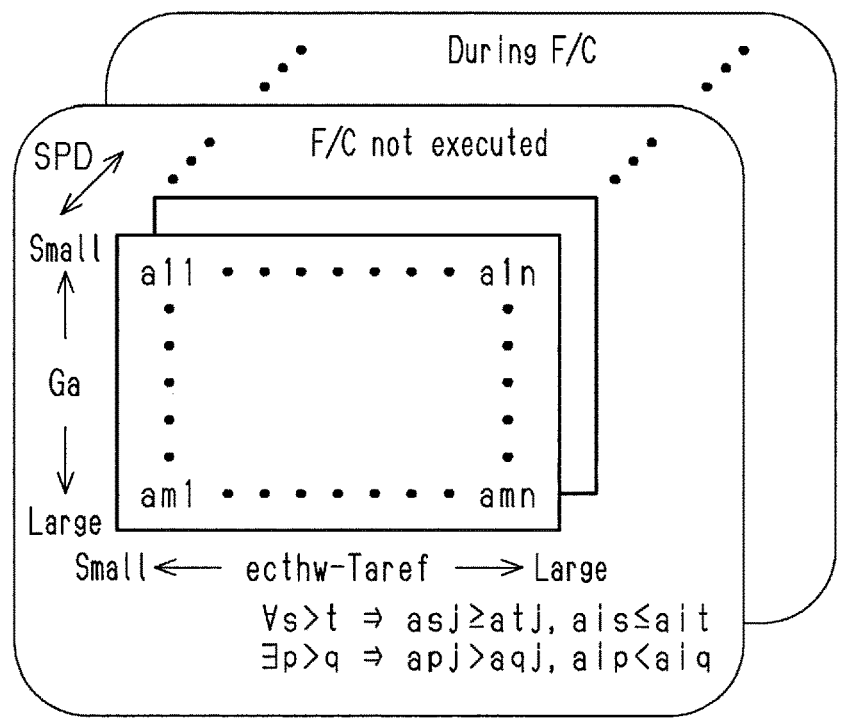
FIG. 5 illustrates a map used to calculate a first update amount according to the embodiment.

Specifically, as illustrated in FIG. 5, a map data is stored in the ROM 64 for each of a plurality of mutually different values of the vehicle speed SPD, the map data taking the value obtained by subtracting the reference intake air temperature Taref from the reference temperature ecthw and the intake air amount Ga as input variables and the first update amount delthw1 as an output variable. The map data is stored in the ROM 64 on a basis of whether or not a fuel-cutoff process is executed. The CPU 62 performs a map calculation to find the first update amount delthw1.

FIG. 5 illustrates that, when the fuel-cutoff process is not performed, an output variable asj in the case of a larger intake air amount Ga is equal to or larger than an output variable atj in the case of a smaller intake air amount Ga, and in particular, a specific output variable apj in the case of a larger intake air amount Ga is larger than a specific output variable aqj in the case of a smaller intake air amount Ga. In the above, j=1 to n: s, t, p, q=1 to m. Further, FIG. 5 illustrates that, when the fuel-cutoff process is not performed, an output variable ais in the case where a value obtained by subtracting a reference intake air temperature Taref from a reference temperature ecthw is larger is equal to or less than an output variable ait in the case where such subtracted value is smaller, and a specific output variable aip in the case where such subtracted value is larger is smaller than a specific output variable aiq in the case where such subtracted value is smaller. In the above, i=1 to m: s, t, p, q=1 to n. Note that at least particularly larger values on output variables aij are positive values.

Referring back to FIG. 4, the CPU 62 determines whether or not the pressure relief control flag F is 1 (S52). If the CPU 62 determines that the pressure relief control flag F is 1 (S52: YES), the CPU 62 calculates a second update amount delthw2 that defines a rate of rise of a reference temperature ecthw based on the value obtained by subtracting the reference intake air temperature Taref from the reference temperature ecthw and the flow rate integrated value InR (S54). Together with the first update amount delthw1, the second update amount delthw2 is an amount that defines a lower limit value for the rate of rise of the water temperature THW when the check valve 28 is normal and the pressure relief control is being performed. Specifically, the CPU 62 calculates a second update amount delthw2 having a smaller value in the case where the value obtained by subtracting the reference intake air temperature Taref from the reference temperature ecthw is large than in the case where the obtained value is small. This is in view of the fact that the cooling water temperature in the radiator channel 32 is lower than the cooling water temperature in the inner channel 16 by a greater amount in the case where the value obtained by subtracting the reference intake air temperature Taref from the reference temperature ecthw is large than in the case where the obtained value is small. Accordingly, the fact that the amount of temperature drop is increased by the colder cooling water flowing into the inner channel 16 is taken into consideration. In addition, the CPU 62 calculates a second update amount delthw2 having a larger value in the case where the flow rate integrated value InR is large that in the case where the flow rate integrated value InR is small. This takes the following into consideration. The amount of water flowing out of the inner channel 16 through the multi-port valve 20 is greater in the case where the flow rate integrated value InR is large than in the case where the flow rate integrated value InR is small. Accordingly, the cooling water temperature flowing into the inner channel 16 increases, reducing the amount of temperature drop due to the cooling water flowing into the inner channel 16. Specifically, a map data is stored in advance in the ROM 64, the map data taking the value obtained by subtracting the reference intake air temperature Taref from the reference temperature ecthw and the flow rate integrated value InR as input variables and the second update amount delthw2 as an output variable. The CPU 62 performs a map calculation to find a second update amount delthw2.

Figure 6:
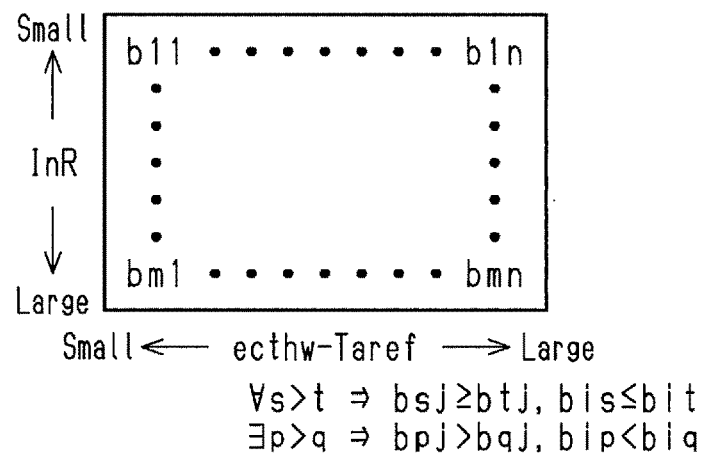
FIG. 6 illustrates a map used to calculate a second update amount according to the embodiment.

FIG. 6 illustrates map data. FIG. 6 illustrates that an output variable bsj in the case of a larger flow rate integrated value InR is equal to or larger than an output variable btj in the case of a smaller flow rate integrated value InR, and a specific output variable bpj in the case of a larger flow rate integrated value InR is larger than a specific output variable bqj in the case of a smaller flow rate integrated value InR. In the above, j=1 to n: s, t, p, q=1 to m. Further, FIG. 6 illustrates that an output variable bis in the case where the value obtained by subtracting the reference intake air temperature Taref from the reference temperature ecthw is larger is equal to or less than an output variable bit in the case where such subtracted value is smaller, and a specific output variable bip in the case where the value obtained by subtracting the reference intake air temperature Taref from the reference temperature ecthw is larger is smaller than a specific output variable biq in the case where such subtracted value is smaller. In the above, i=1 to m: s, t, p, q=1 to n. Note that, in the embodiment, the second update amount delthw2 is at zero or lower. In other words, a small second update amount delthw2 means that the absolute value is large. Particularly in the embodiment, the absolute value of the second update amount delthw2 may be larger than the first update amount delthw1. This is a setting such that the rate of rise (delthw1+dcelthw2) of the reference temperature ecthw may be negative.

Referring back to FIG. 4, if the CPU 62 determines that the pressure relief control flag F is 0 (S52: NO), the CPU 62 assigns zero to the second update amount delthw2 (S56). When the processes S54 and S56 are completed, the CPU 62 updates the reference temperature ecthw with a value obtained by adding the first update amount delthw1 and the second update amount delthw2 to the reference temperature ecthw (S58).

The CPU 62 determines whether or not the reference temperature ecthw is equal to or higher than the threshold Tth (S60). If the CPU 62 determines that the reference temperature ecthw is equal to or higher than the threshold Tth (S60: YES), the CPU 62 increments the reference counter C2 (S62). Then, the CPU 62 determines whether or not the reference counter C2 is equal to or higher than the threshold Cth (S64). If the CPU 62 determines that the reference counter C2 is equal to or higher than the threshold Cth (S64: YES), the CPU 62 makes an anomaly determination in that a stuck-open anomaly occurs in the check valve 28 (S66). Further, the CPU 62 executes a notifying process of prompting the user of the vehicle to carry out a repair by operating an alarm lamp 82 illustrated in FIG. 1 (S68).

When the processes S48 and S68 are completed, and if the CPU 62 makes a negative determination at the processes S40, S60 and S64, the CPU 62 ends the series of processes illustrated in FIG. 4.

Operation and advantages of the present embodiment will now be described.

Figure 7:
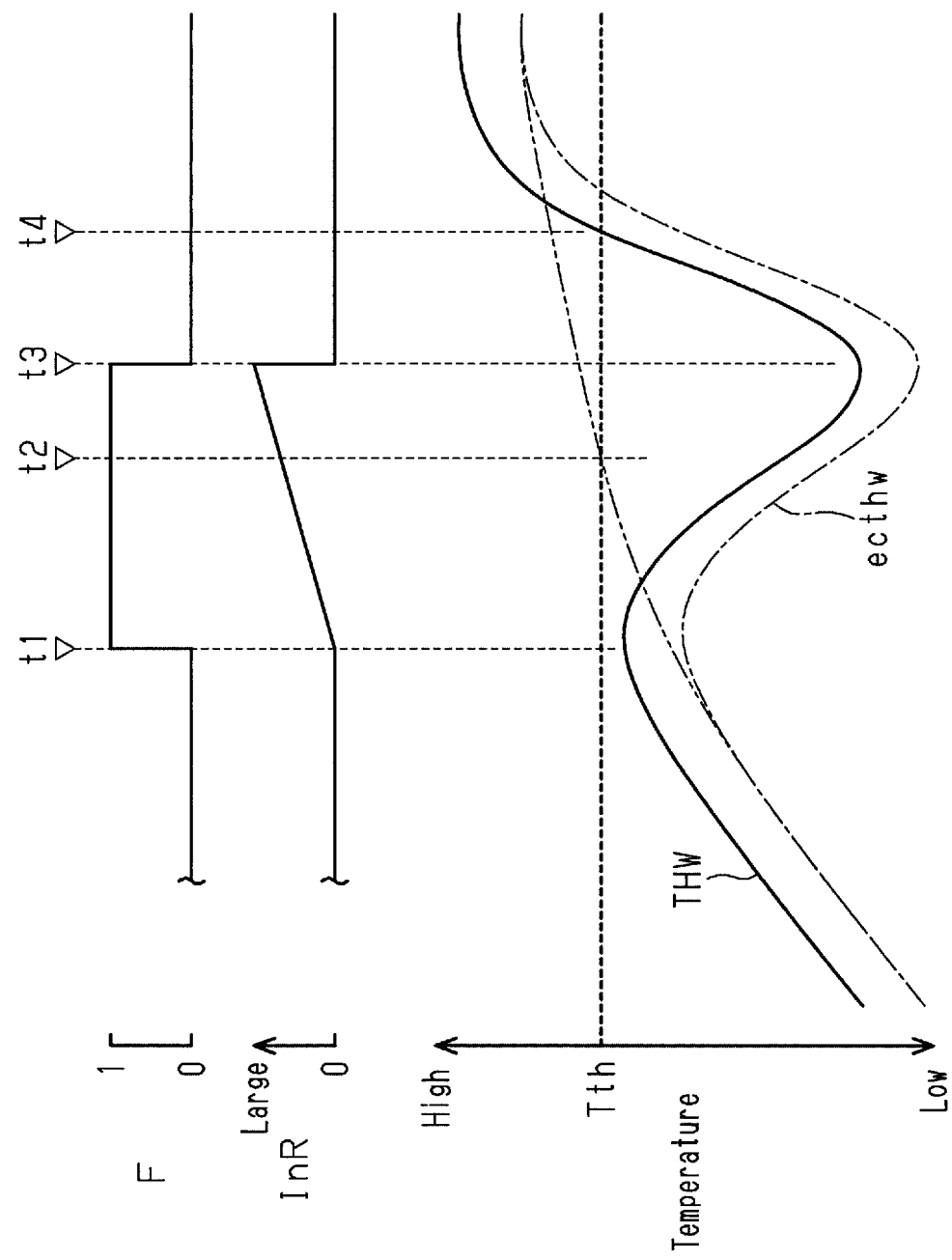
FIG. 7 is a timing diagram illustrating advantages of the embodiment.

FIG. 7 illustrates a transition of the diagnosing process according to the embodiment. Specifically, FIG. 7 illustrates a transition of the pressure relief control flag F, the flow rate integrated value InR, and temperature. Note that FIG. 7 illustrates the case where no stuck-open anomaly occurs in the check valve 28.

Upon cold start of the internal combustion engine 10, the CPU 62 calculates the reference temperature ecthw. Basically, the CPU 62 calculates the reference temperature ecthw on the premise that the multi-port valve 20 is in a valve-closed state. However, when the pressure relief control is performed over the period from a point in time t1 to a point in time t3, the CPU 62 calculates the reference temperature ecthw taking into consideration that the water temperature THW decreases due to the cooling water flowing into the inner channel 16 from channels such as the radiator channel 32. Accordingly, during the period from the point in time t1 to the point in time t3, the reference temperature ecthw also tends to decrease similar to the water temperature THW. Then, due to the pressure relief control being stopped at the point in time t3, both the water temperature THW and the reference temperature ecthw show a tendency of rising instead, and the water temperature THW first reaches the threshold Tth at the point in time t4.

In contrast, if the second update amount delthw2 is always set to have zero, the reference temperature ecthw increases even during the pressure relief control as illustrated by a long dashed double-short-dashed line in FIG. 7. As a result, the reference temperature ecthw reaches the threshold Tth at the point in time t2, and thereafter, there may be a false determination indicative of anomaly even though the check valve 28 is normal.

According to the embodiment described above, further operational advantages can be obtained as described below.

(1) For the water temperature THW, an internal temperature Tin or an exit temperature Tout, whichever higher, is employed. Accordingly, a tendency of the internal temperature Tin to be higher than the exit temperature Tout while the multi-port valve 20 is closed, or a tendency of the exit temperature Tout to be higher than the internal temperature Tin as the multi-port valve 20 is opened is reflected to the water temperature THW. In this way, it is possible to avoid such a situation that the water temperature THW falls below the reference temperature ecthw.

(2) An input to the calculating process of the second update amount delthw2 is calculated based on the reference intake air temperature Taref. In this way, it is possible to prevent the cooling water temperature in the radiator channel 32 from being estimated higher than in reality, as compared to the case where only the initial intake air temperature Ta0 is used or the case where only the intake air temperature Ta is used.

<Correspondence>

The correspondence between the items in the above-described embodiment and the items described in the above SUMMARY is as follows. Below, the correspondence is shown for each of the numbers in the above SUMMARY.

Example 1

The regulating device corresponds to the multi-port valve 20. The cooling device corresponds to the inner channel 16, the radiator channel 32, the device channel 34, the heater core channel 36, the multi-port valve 20, the radiator 40, and the water pump 50. The anomaly diagnosing apparatus corresponds to the control device 60. The enlarging process corresponds to the processes S24 and S26. The rate calculating process corresponds to the processes S50 to S56. The anomaly determining process corresponds to the processes S42 to S48 and S60 to S66. In other words, the reference rate corresponds to (delthw1+delthw2). The rate of rise, which is the detection value, corresponds to the value obtained by subtracting the water temperature THW in the previous control cycle from the water temperature THW in the current control cycle in the processes in FIG. 4. Accordingly, when a positive determination is made in the process S64 before a positive determination is made in the process S46, this implies that there has been a period in which the detection-value rate of rise is smaller than the reference rate before the positive determination.

Example 2

The integrating process corresponds to the process S28. The rate calculating process corresponds to the process by means of the map data illustrated in FIG. 6.

Example 3

The temperature calculating process corresponds to the process S58. The rate calculating process corresponds to the process by means of the map data illustrated in FIG. 6.

Example 4

The temperature calculating process corresponds to the process S58.

Example 5

The detection value increment process corresponds to the process S44. The reference increment process corresponds to the process S62.

Other Embodiments

The above-described embodiment may be modified as follows. The present embodiment and the following modifications can be combined as long as the combined modifications remain technically consistent with each other.

Regarding Enlarging Process

In the above-described embodiment, if the rotational speed NE is at a predetermined speed NEth or higher, the opening ratio of the radiator port 22 is set to have a larger value in the case where the rotational speed NE is large than in the case where the rotational speed NE is small. However, this is not a limitation. For example, if the rotational speed NE is lower than the predetermined speed NEth, the opening ratio may be set to have zero, and if it is at a predetermined speed NEth or higher, the opening ratio may be set to have a single value that is larger than zero.

If the rotational speed NE is at a predetermined speed NEth or higher, setting the opening ratio of the radiator port 22 to a larger value is not essential. For example, only the opening ratio of the device port 24 may be made larger than zero as long as a pressure rise in the inner channel 16 can be limited. For example, as long as a pressure rise in the inner channel 16 can be limited, the valve phase θ may be made positive, and the opening ratios of both the device port 24 and the heater core port 26 is made larger than zero, while the opening ratio of the radiator port 22 may be maintained at zero.

Further, for example, the opening ratio of the device port 24 may be slightly larger than zero even if the rotational speed NE is less than the predetermined speed NEth, and if the rotational speed NE is at a predetermined speed NEth or higher, the opening ratio of the device port 24 may be enlarged, or the opening ratio of the radiator port 22 may be made larger than zero.

In the above-described embodiment, the pressure relief control is performed only in a predetermined time period. However, this is not a limitation. Even after the predetermined time period has passed, the pressure relief control may be performed, for example, if the opening ratio of any port such as the radiator port 22 is insufficient and it may not be possible to sufficiently prevent the pressure from excessively increasing.

Regarding Integrating Process

In the above-described embodiment, the flow rate ΔR is changeably set based on the rotational speed NE and the valve phase θ. However, this is not a limitation. For example, as described in the section Regarding Enlarging Process, when only the device port 24 is to be opened, the flow rate ΔR may be changeably set based on the opening ratio of the device port 24 and the rotational speed NE. Further, for example, if the cooling device is provided with a flow rate sensor for detecting the flow rate of the cooling water flowing out from the inside to the outside of the internal combustion engine 10 through the multi-port valve 20, the flow rate ΔR may be detected by the flow rate sensor.

Regarding Rate Calculating Process

In the above-described embodiment, the first update amount delthw1 is found by map calculation based on the map data taking the value obtained by subtracting the reference intake air temperature Taref from the reference temperature ecthw and the intake air amount Ga as input variables. However, this is not a limitation. For example, instead of the reference intake air temperature Taref, the intake air temperature Ta at each moment may be used. Instead of the reference intake air temperature Taref, the initial intake air temperature Ta0 may be used. For example, instead of the reference temperature ecthw, an integrated value of the intake air amount Ga may be used, and the map calculation may be performed based on the integrated value and the reference intake air temperature Taref. Further, as two-dimensional map data, for example, the map data taking the vehicle speed SPD and the intake air amount Ga as input variables may be provided for each value obtained by subtracting the reference intake air temperature Taref from the reference temperature ecthw. Further, such two-dimensional map data is not a limitation, and for example, the map data taking the vehicle speed SPD, the intake air amount Ga, and the value obtained by subtracting the reference intake air temperature Taref from the reference temperature ecthw as input variables may be provided on a basis of whether or not a fuel-cutoff is executed. Further, instead of the intake air amount Ga, an injection amount may be used. This is especially effective when an internal combustion engine of a compression ignition type such as a diesel engine is used, as described in the section Regarding Internal Combustion Engine.

In the above-described embodiment, the second update amount delthw2 is found by map calculation based on the map data taking the value obtained by subtracting the reference intake air temperature Taref from the reference temperature ecthw and the flow rate integrated value InR as input variables. However, this is not a limitation. For example, among the two parameters: the value obtained by subtracting the reference intake air temperature Taref from the reference temperature ecthw and the flow rate integrated value InR, only one of them may be used to calculate the second update amount delthw2. For example, instead of the reference intake air temperature Taref, the intake air temperature Ta at each moment may be used. Further, instead of the reference intake air temperature Taref, the initial intake air temperature Ta0 may be used.

Regarding Anomaly Determining Process

In the above-described embodiment, it is determined that an anomaly is present when accumulated time in which the reference temperature ecthw is equal to or higher than the threshold Tth reaches the predetermined value Cth before accumulated time in which the water temperature THW is equal to or higher than the threshold Tth reaches the predetermined value Cth. However, this is not a limitation. For example, the detection-value counter C1 and the reference counter C2 may be omitted, and it may be determined that an anomaly is present when the reference temperature ecthw reaches or exceeds the threshold Tth before the water temperature THW reaches or exceeds the threshold Tth. Instead of the water temperature THW, the internal temperature Tin may be used. Further, instead of the water temperature THW, the exit temperature Tout, for example, may be used.

Further, the process of determining whether an anomaly is present or not is not limited to being based on the fact that the temperature is equal to or higher than the threshold Tth. For example, in the duration within which the water temperature THW reaches the threshold Tth, when the rate of rise (delthw1+delthw2) of the reference temperature ecthw is larger than the rate of rise of the water temperature THW, a pseudo anomaly counter may be incremented and when the pseudo anomaly counter reaches a predetermined value, it may be determined that anomaly is present.

Regarding Regulating Device

In the above-described embodiment, in order for the multi-port valve 20 to set the opening ratio of the radiator port 22 from zero to a value larger than zero, it is necessary to set the opening ratio of the device port 24 from zero to a value larger than zero. However, this is not a limitation. For example, it may be possible to employ a multi-port valve 20 capable of setting the opening ratio of the radiator port 22 from zero to a value larger than zero while the opening ratios of the device port 24 and the heater core port 26 are maintained at zero.

The regulating device is not limited to the multi-port valve 20, and may be, for example, a valve body provided with a single port that connects the radiator channel 32, the device channel 34 and the heater core channels 36 to the inner channel 16.

In the above-described embodiment, the outer channel into which cooling water flows when the check valve 28 is opened is located downstream of the radiator channel 32. However, this is not a limitation. The outer channel into which cooling water flows when the check valve 28 is opened may be, for example, the device channel 34.

Regarding Anomaly Diagnosing Apparatus

The anomaly diagnosing apparatus is not limited to an apparatus that includes the CPU 62 and the ROM 64 and executes software processing. For example, at least part of the processes executed by the software in the above-illustrated embodiments may be executed by hardware circuits dedicated to executing these processes (such as ASIC). That is, the anomaly diagnosing apparatus may be modified as long as it has any one of the following configurations (a) to (c). (a) A configuration including a processor that executes all of the above-described processes according to programs and a program storage device such as a ROM that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. A plurality of software processing circuits each including a processor and a program storage device and a plurality of dedicated hardware circuits may be provided. That is, the above processes may be executed in any manner as long as the processes are executed by processing circuitry that includes at least one of a set of one or more software processing circuits and a set of one or more dedicated hardware circuits.

Regarding Internal Combustion Engine

The internal combustion engine is not limited to a spark-ignition engine. For example, the internal combustion engine may be a compression ignition engine such as a diesel engine.

Therefore, the present examples and embodiments are to be considered as illustrative and not restrictive and the disclosure is not to be limited to the examples and embodiments given herein.

The invention claimed is:

1. A cooling device anomaly diagnosing apparatus adapted for a cooling device in an internal combustion engine, wherein the cooling device includes an inner channel serving as a cooling channel located inside the internal combustion engine, an outer channel serving as a cooling channel located outside the internal combustion engine, the outer channel constituting, together with the inner channel, a loop path in which cooling water is circulated, and a multi-port valve capable of adjusting a cross-sectional area of a flow passage between the inner channel and the outer channel by an electronic control, the multi-port valve including a check valve configured to open when a pressure inside is higher than a pressure in the outer channel by an amount greater than or equal to a predetermined amount, the anomaly diagnosing apparatus is configured to execute an enlarging process of enlarging the cross-sectional area of the flow passage by operating the multi-port valve such that the cross-sectional area is larger in a case where a rotational speed of a crankshaft of the internal combustion engine is at a predetermined speed or higher than in a case where the rotational speed is lower than the predetermined speed, a rate calculating process of calculating, within a predetermined time period after startup of the internal combustion engine, a reference rate such that the reference rate has a larger value in a case where a fuel injection amount of the internal combustion engine is large than in a case where the fuel injection amount is small, the reference rate being a reference value for a rate of rise of a cooling water temperature in sections of the loop path other than the outer channel, and an anomaly determining process of determining, within the predetermined time period, that an anomaly is present in the check valve if a rate of rise of a detection value of a cooling water temperature in paths other than the outer channel is smaller than the reference rate, and a notifying process to prompt a user if an anomaly is determined to be present in the check valve, wherein the rate calculating process includes calculating the reference rate such that the reference value has a smaller value in a case where the enlarging process is executed than in a case where the enlarging process is not executed.

2. The cooling device anomaly diagnosing apparatus according to claim 1, wherein the anomaly diagnosing apparatus is further configured to execute an integrating process of calculating a flow rate integrated value, which is an integrated value of an amount of cooling water circulating in the loop path through the multi-port valve within a period in which the cross-sectional area of the flow passage is enlarged by the enlarging process, and the rate calculating process includes calculating the reference rate such that the reference rate has a smaller value in a case where the flow rate integrated value is small than in a case where the flow rate integrated value is large.

3. The cooling device anomaly diagnosing apparatus according to claim 1, wherein the anomaly diagnosing apparatus is further configured to execute a temperature calculating process of calculating a reference temperature based on the integrating process of the reference rate, the reference temperature being a reference value for a cooling water temperature, and the rate calculating process includes calculating, within a period in which the cross-sectional area of the flow passage is enlarged by the enlarging process, the reference rate such that the reference rate has a smaller value in a case where an amount by which the reference temperature is higher than an outside air temperature is great than in a case where the amount is small, and a reference rate calculated by the process may be a negative value.

4. The cooling device anomaly diagnosing apparatus according to claim 1 wherein the anomaly diagnosing apparatus is further configured to execute a temperature calculating process of calculating a reference temperature based on the integrating process of the reference rate, the reference temperature being a reference value for cooling water temperature, and the anomaly determining process is a process of, when the reference temperature reaches or exceeds a threshold earlier than the detection value of the cooling water temperature reaching or exceeding the threshold, determining that the rate of rise of the detection value of the cooling water temperature is smaller than the reference rate and an anomaly is present in the check valve.

5. The cooling device anomaly diagnosing apparatus according to claim 4, comprising a detection-value counter and a reference counter, wherein the anomaly determining process includes
  a detection value increment process of incrementing the detection-value counter each time the detection value of cooling water temperature reaches or exceeds the threshold,
  a reference increment process of incrementing the reference counter each time the reference temperature reaches or exceeds the threshold, and
  a process of determining that an anomaly is present in the check valve when the reference counter reaches the predetermined value before the detection-value counter reaches the predetermined value.

\* \* \* \* \*